United States Patent
Tanaka et al.

(10) Patent No.: US 11,152,017 B2
(45) Date of Patent: Oct. 19, 2021

(54) CARD READER HAVING CHOPPING DRIVE CIRCUIT WITH CYCLE SHORTER THAN READING GAP AND CONTROL METHOD FOR CARD READER

(71) Applicant: NIDEC SANKYO CORPORATION, Nagano (JP)

(72) Inventors: Jo Tanaka, Nagano (JP); Yohei Shimizu, Nagano (JP); Yufei Gu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/955,048

(22) PCT Filed: Dec. 4, 2018

(86) PCT No.: PCT/JP2018/044559
§ 371 (c)(1),
(2) Date: Jun. 18, 2020

(87) PCT Pub. No.: WO2019/124057
PCT Pub. Date: Jun. 27, 2019

(65) Prior Publication Data
US 2020/0381010 A1    Dec. 3, 2020

(30) Foreign Application Priority Data

Dec. 18, 2017    (JP) ............................. JP2017-241269

(51) Int. Cl.
*G11B 25/04*    (2006.01)
*G11B 5/008*    (2006.01)
(Continued)

(52) U.S. Cl.
CPC .......... *G11B 5/00808* (2013.01); *G06K 1/125* (2013.01); *G06K 7/084* (2013.01);
(Continued)

(58) Field of Classification Search
None
See application file for complete search history.

(56) References Cited

U.S. PATENT DOCUMENTS

| 4,965,873 A | 10/1990 | White |
| 6,693,852 B2 | 2/2004 | Koike et al. |
| (Continued) | | |

FOREIGN PATENT DOCUMENTS

| CN | 1379298 | 11/2002 |
| CN | 103793674 | 5/2014 |
| (Continued) | | |

OTHER PUBLICATIONS

"International Search Report (Form PCT/ISA/210)" of PCT/JP2018/044559, dated Feb. 19, 2019, with English translation thereof, pp. 1-3.

(Continued)

*Primary Examiner* — Craig A. Renner
(74) *Attorney, Agent, or Firm* — JCIPRNET

(57) ABSTRACT

A card reader includes a writing coil that is provided to a magnetic head for recording magnetic data in a magnetic card, and a drive circuit that supplies a write current to the writing coil. The drive circuit is a chopping circuit that supplies a chopping current, on/off of which is switched in a specified cycle, as the write current to the writing coil. An on/off cycle of the chopping current is a cycle in which a length of a magnetized pattern in a recording direction is shorter than a reading gap formed in a core around which the writing coil is wound or a core around which a reading coil being separately provided from the writing coil is wound, the magnetized pattern in the recording direction being formed in the magnetic card by the chopping current in a period including one each of the on and the off.

9 Claims, 3 Drawing Sheets

(51) Int. Cl.
  *G11B 5/09* (2006.01)
  *G11B 20/10* (2006.01)
  *G06K 1/12* (2006.01)
  *G06K 7/08* (2006.01)
  *G11B 5/153* (2006.01)
  *G11B 5/17* (2006.01)

(52) U.S. Cl.
  CPC ............... *G06K 7/087* (2013.01); *G11B 5/09* (2013.01); *G11B 20/10009* (2013.01); *G11B 25/04* (2013.01); *G11B 5/153* (2013.01); *G11B 5/17* (2013.01)

(56) References Cited

U.S. PATENT DOCUMENTS

| | | |
|---|---|---|
| 8,824,073 B2 | 9/2014 | Miyabe et al. |
| 9,001,455 B2 | 4/2015 | Nakashio et al. |
| 9,552,501 B2 | 1/2017 | Miyabe et al. |

FOREIGN PATENT DOCUMENTS

| | | |
|---|---|---|
| CN | 104050984 | 9/2014 |
| JP | H05347005 | 12/1993 |
| JP | 2000173008 | 6/2000 |
| JP | 2001291203 | 10/2001 |
| JP | 2014087161 | 5/2014 |

OTHER PUBLICATIONS

"Office Action of China Counterpart Application CN 201880081528,", dated Mar. 2, 2021, with English translation thereof, pp. 1-15.

(a)

(b)

(a)

(b)

(c)

(d)

CARD READER HAVING CHOPPING DRIVE CIRCUIT WITH CYCLE SHORTER THAN READING GAP AND CONTROL METHOD FOR CARD READER

CROSS-REFERENCE TO RELATED APPLICATION

This application is a 371 application of the International PCT application serial no. PCT/JP2018/044559, filed on Dec. 4, 2018, which claims the priority benefits of Japan Patent Application No. 2017-241269, filed on Dec. 18, 2017. The entirety of each of the above-mentioned patent applications is hereby incorporated by reference herein and made a part of this specification.

TECHNICAL FIELD

The present invention relates to a card reader including a magnetic head and a control method for the same.

BACKGROUND ART

A card reader that includes a magnetic head for writing magnetic data on a magnetic card has been available. A rank of magnetization strength of a region where the magnetic data is recorded in the magnetic card is standardized in standards such as those of JIS and ISO. Thus, the card reader includes a drive circuit that supplies a current complying with these standards (hereinafter referred to as a write current) to the magnetic head. In Patent Literature 1, a resistor is provided to the circuit that supplies the write current to the magnetic head, so as to limit the current. In addition, in Patent Literature 1, as the drive circuit for the magnetic head that records the magnetic data on a high coercive force card (a Hi-Co card) with the higher magnetization strength than a low coercive force card (a Lo-Co card), a circuit that switches a power supply voltage is described.

CITATION LIST

Patent Literature

[Patent Literature 1] Japanese Unexamined Patent Application Publication No. 2001-291203

SUMMARY OF THE INVENTION

Problems to be Solved by the Invention

When the write current that corresponds to the magnetization strength of the magnetic card is supplied to the magnetic head for recording of the magnetic data, the current is limited by using the resistor as in Patent Literature 1, and a voltage of the supplied current is reduced by switching the power supply voltage, so as to reduce the magnetization strength of the magnetic card with the low magnetization strength. However, when the resistor is used, the resistor with a large allowable current has to be used. As a result, a resistor mounting area on a substrate is increased, which causes problems of enlargement and increased cost of the drive circuit. In addition, an influence of generated heat from the resistor also becomes a problem. Furthermore, in the case where the power supply voltage is switched, the circuit becomes complicated.

To handle the above problems, it is considered to reduce an effective value of the voltage and thereby adjust the magnetization strength by using a chopping current as the write current. However, when the magnetic card is magnetized by using the chopping current, fluctuations in the chopping current occurred by turning on/off thereof appear in a magnetized pattern that is formed on the magnetic card. As a result, when the magnetic data (the magnetized pattern) that is recorded by the chopping current is read, a favorable reproduced waveform may not be acquired.

In view of the above problems, an object of the present invention is to provide a card reader that includes a magnetic head for recording magnetic data and that can record the magnetic data, from which a favorable reproduced waveform is acquired, by using a chopping current, and a control method for the same.

Means for Solving the Problem

In order to solve the above problem, a card reader according to the present invention includes a writing coil that is provided to a magnetic head for recording magnetic data in a magnetic card, and a drive circuit that supplies a write current to the writing coil. The drive circuit is a chopping circuit that supplies a chopping current, on/off of which is switched in a specified cycle, as the write current to the writing coil. An on/off cycle of the chopping current is a cycle in which a length of a magnetized pattern in a recording direction is shorter than a reading gap formed in a core around which the writing coil is wound or a core around which a reading coil being separately provided from the writing coil is wound, the magnetized pattern in the recording direction being formed in the magnetic card by the chopping current in a period including one each of the on and the off.

In order to solve the above problem, the present invention relates to a control method for a card reader that includes a magnetic head for recording magnetic data in a magnetic card. The control method for the card reader includes supplying a chopping current, on/off of which is switched in a specified cycle, to a writing coil provided to the magnetic head from a drive circuit for supplying a write current to the writing coil so as to record the magnetic data in the magnetic card. An on/off cycle of the chopping current is a cycle in which a length of a magnetized pattern in a recording direction is shorter than a reading gap formed in a core around which the writing coil is wound or a core around which a reading coil being separately provided from the writing coil is wound, the magnetized pattern in the recording direction being formed in the magnetic card by the chopping current in a period including one each of the on and the off.

In the present invention, the chopping current is supplied to the writing coil that is provided to the magnetic head for recording the magnetic data. Thus, it is possible to adjust an effective value of the write current and adjust magnetization strength of the magnetic card by controlling a duty ratio of the chopping current. Accordingly, there is no need to adjust the write current by using a resistor and a plurality of power supplies. Therefore, it is possible to downsize and reduce cost of the drive circuit for the writing coil and to simplify a circuit configuration. In addition, it is possible to avoid an increase in a generated heat amount from the resistor.

In the present invention, the length of the magnetized pattern in the recording direction that is recorded in the single on/off period of the chopping current is shorter than the gap (reading gap) formed in the core (the core around which the writing coil is wound in the case where the core serves as both of the writing coil and the reading coil, or the core around which the reading coil is wound in the case where the writing coil and the reading coil are separately provided) around which the coil generating an induced current at the time of reading the magnetic data is wound. Accordingly, even in the case where the magnetized pattern fluctuates due to the on/off of the chopping current at the time when the magnetic head reads the magnetic data (the magnetized pattern) recorded by the chopping current, the magnetized pattern that is recorded in the on period of the chopping current includes at least one peak within the range of the reading gap, and thus the fluctuation in the magnetized pattern that is caused by the on/off of the chopping current is less likely to be reflected to the reproduced waveform. As a result, the favorable reproduced waveform can be acquired. Furthermore, in the case where the effective value is reduced by adjusting the duty ratio of the chopping current so as to reduce the magnetization strength, the write current rises favorably when compared to a case where a voltage is reduced. Thus, when the recorded magnetic data is read, the reproduced waveform has the similar shape to the rectangular wave. Therefore, it is possible to record the magnetic data, the favorable reproduced waveform of which can be acquired, in the magnetic card with the low magnetization strength.

A configuration to supply the drive circuit with a first control signal used to set the on/off cycle of the chopping current and a second control signal used to set a duty ratio of the chopping current can be adopted for the card reader and the control method for the same in the present invention. In this way, the on/off cycle and the duty ratio of the chopping current can be adjusted individually from each other.

In this case, the second control signal is preferably a signal used to set the duty ratio that corresponds to magnetization strength of the magnetic data in the magnetic card. As a result, a magnetic field that complies with a rank of the magnetization strength of the magnetic card can be generated. Therefore, operation to record the magnetic data that complies with a standard of the magnetic card can be performed.

In the card reader according to the present invention, a motor driver IC can be used as the drive circuit.

Effect of the Invention

According to the present invention, since the chopping current is supplied to the writing coil that is provided to the magnetic head for recording the magnetic data, the effective value of the write current is adjusted by controlling the duty ratio of the chopping current, and the magnetization strength for the magnetic card can thereby be adjusted. Thus, there is no need to adjust the write current by using a resistor and a plurality of power supply voltages. Therefore, it is possible to downsize and reduce cost of the drive circuit for the writing coil and to thereby simplify the circuit configuration. In addition, it is possible to avoid an increase in a generated heat amount from the resistor.

According to the present invention, the length of the magnetized pattern in the recording direction, which is recorded in the single on/off period of the chopping current, is shorter than the gap (the reading gap) formed in the core of the magnetic head for reading the magnetic data. Accordingly, even in the case where the magnetized pattern fluctuates due to the on/off of the chopping current at the time when the magnetic head reads the magnetic data (the magnetized pattern) recorded by the chopping current, the magnetized pattern that is recorded in the on period of the chopping current includes the at least one peak within the range of the reading gap, and thus the fluctuation in the magnetized pattern that is caused by the on/off of the chopping current is less likely to be reflected to the reproduced waveform.

As a result, the favorable reproduced waveform can be acquired. Furthermore, in the case where the effective value is reduced by adjusting the duty ratio of the chopping current so as to reduce the magnetization strength, the write current rises favorably when compared to the case where the voltage is reduced. Thus, when the recorded magnetic data is read, the reproduced waveform has the similar shape to the rectangular wave. Therefore, it is possible to record the magnetic data, the favorable reproduced waveform of which can be acquired, in the magnetic card with the low magnetization strength.

MODE FOR CARRYING OUT THE INVENTION

Figure 1:
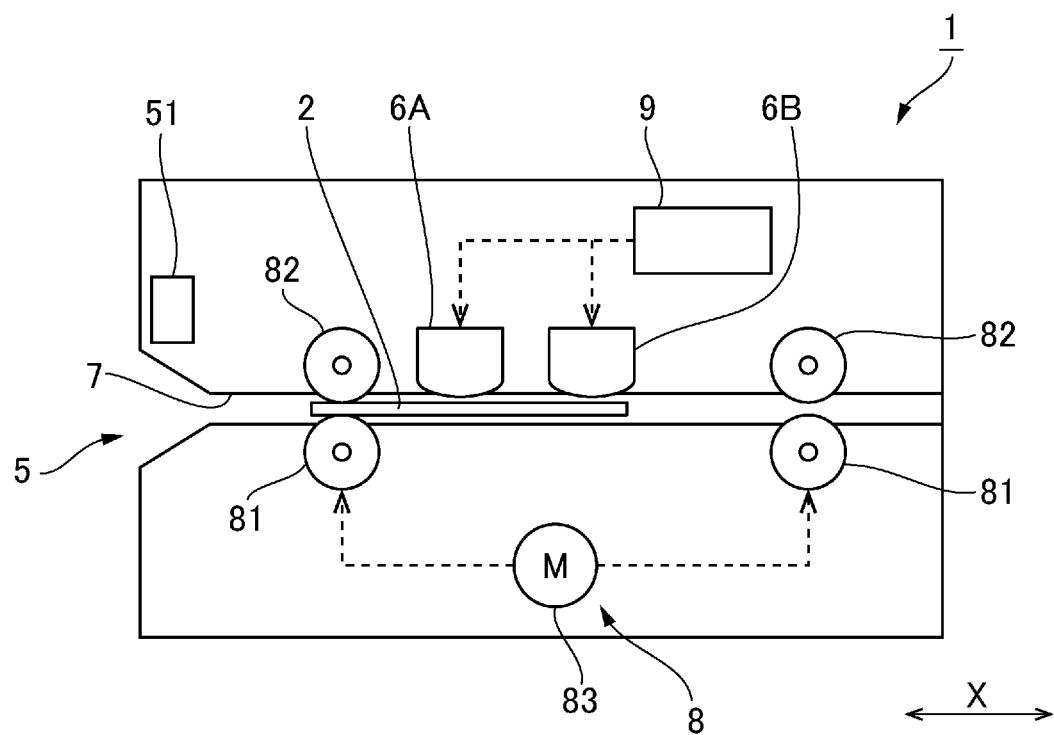
FIG. 1 includes a view for illustrating a card reader, to which the present invention is applied, and a view for illustrating a magnetic card.
Figure 1:
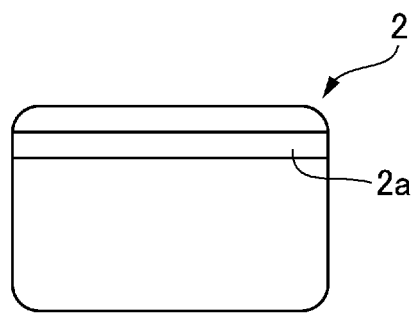

A description will hereinafter be made on a card reader, to which the present invention is applied, and a control method for the same with reference to the drawings. FIG. 1(a) is a view for illustrating a card reader 1 to which the present invention is applied, and FIG. 1(b) is a view for illustrating a magnetic card 2. The card reader 1 writes magnetic data on a magnetic stripe 2a that is formed in the magnetic card 2, and reads the magnetic data recorded in the magnetic stripe 2a.

Overall Configuration

The card reader 1 includes a card insertion slot 5, a writing magnetic head 6A, a reading magnetic head 6B, a card transport path 7 that extends linearly in a card transport direction X from the card insertion slot 5 through the writing magnetic head 6A and the reading magnetic head 6B, and a card transport mechanism 8 that takes the magnetic card 2 inserted in the card insertion slot 5 in the card transport path 7 and transports the magnetic card 2 along the card transport path 7. Each of the writing magnetic head 6A and the reading magnetic head 6B includes a sensor surface 61 capable of contacting the magnetic card 2 that is passed in the card transport path 7. The card transport mechanism 8 includes a plurality of pairs of drive rollers 81 and pad rollers 82, each pair of which holds the magnetic card 2 therebetween to transport. The card transport mechanism 8 also includes a transport motor 83 that causes each of the drive rollers 81 to rotate.

When the magnetic card 2 is inserted in the card insertion slot 5, in the card reader 1, a sensor 51 that is provided to the card insertion slot 5 detects the magnetic card 2, and the transport motor 83 is then driven to cause the drive rollers 81 to rotate. Accordingly, the magnetic card 2 is transported along the card transport path 7, and slidingly contacts the sensor surface 61 of each of the writing magnetic head 6A and the reading magnetic head 6B when passing a position of each of the magnetic heads. When the magnetic data is written on the magnetic card 2, the writing magnetic head 6A is driven to generate a magnetic field for magnetizing the magnetic card 2. Meanwhile, when the magnetic data recorded in the magnetic card 2 is read, a change in the magnetic field at the time when the magnetic card 2 passes the sensor surface 61 of the reading magnetic head 6B is detected.

Electrical Configuration

Figure 2:
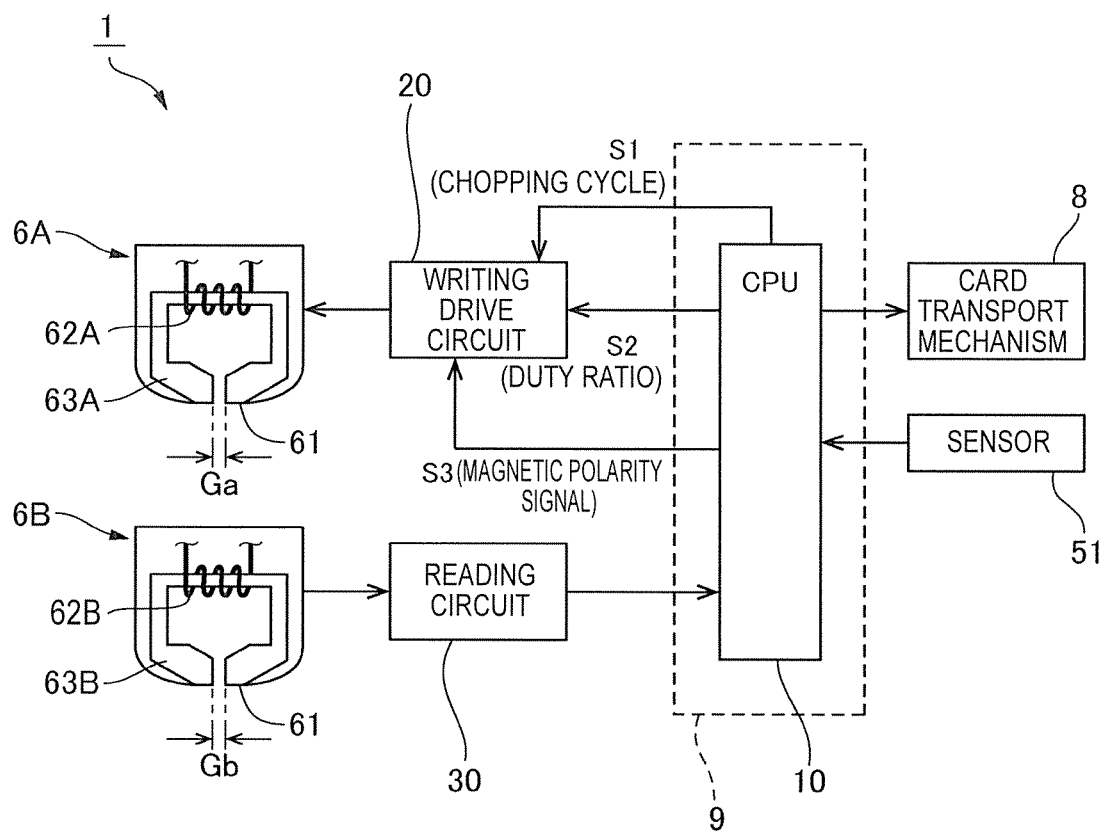
FIG. 2 is a block diagram illustrating an electrical configuration of the card reader.

FIG. 2 is a block diagram illustrating an electrical configuration of the card reader 1. A control unit 9 of the card reader 1 includes a CPU 10. The CPU 10 receives a detection signal of the sensor 51 that is provided to the card insertion slot 5. The CPU 10 controls the card transport mechanism 8 on the basis of the detection signal of the sensor 51. The CPU 10 outputs a control signal to a motor driver, which is not illustrated, and drives the transport motor 83 by using the control signal from the motor driver, so as to perform operation to transport the magnetic card 2 to a back side of the card transport path 7 and operation to eject the magnetic card 2 from the card insertion slot 5. Another sensor may be provided at a different position from the sensor 51 to determine a position of the magnetic card 2.

The CPU 10 drives the writing magnetic head 6A via a writing drive circuit 20 and records the magnetic data in the magnetic card 2. In addition, when the magnetic stripe 2a of the magnetic card 2 passes the sensor surface 61 of the reading magnetic head 6B, the CPU 10 acquires digital data that is output from a reading circuit 30 on the basis of an analog signal output from a reading coil 62B.

As illustrated in FIG. 2, the writing magnetic head 6A includes a writing coil 62A to which a write current is supplied from the writing drive circuit 20, and a core 63A around which the writing coil 62A is wound. In the core 63A, a write gap Ga is formed in a portion that is exposed to the sensor surface 61 of the writing magnetic head 6A. The writing drive circuit 20 supplies the write current to the writing magnetic head 6A on the basis of the control signal that is supplied from the CPU 10.

In this embodiment, the writing drive circuit 20 is a motor driver IC, generates a chopping current as the write current, and supplies the chopping current to the writing coil 62A. That is, the writing drive circuit 20 is a chopping circuit. The CPU 10 supplies the writing drive circuit 20 with a first control signal S1 (chopping cycle) used to set an on/off cycle of the chopping current, a second control signal S2 (duty ratio) used to set a duty ratio of the chopping current, and a third control signal S3 (magnetic polarity signal) that is a magnetic polarity signal used to control a polarity of the magnetic field to be generated. The second control signal S2 is supplied to the writing drive circuit 20 via a different route from the first control signal S1. Thus, the on/off cycle of the chopping current and the duty ratio are controlled independently from each other.

The reading magnetic head 6B includes the reading coil 62B that is connected to the reading circuit 30, and a core 63B around which the reading coil 62B is wound. In the core 63B, a reading gap Gb is formed in a portion that is exposed to the sensor surface 61 of the reading magnetic head 6B. The reading circuit 30 executes processing to convert a waveform of an analog current that is output from the reading coil 62B into a rectangular wave and convert the analog current into the digital data by a demodulating circuit, so as to output the digital data to the CPU 10.

Chopping Control

Figure 3:
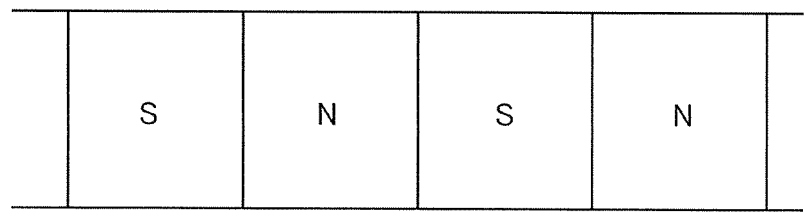
FIG. 3 includes views for illustrating a waveform of a chopping current, a magnetized pattern by the chopping current, and a reproduced waveform.
Figure 3:
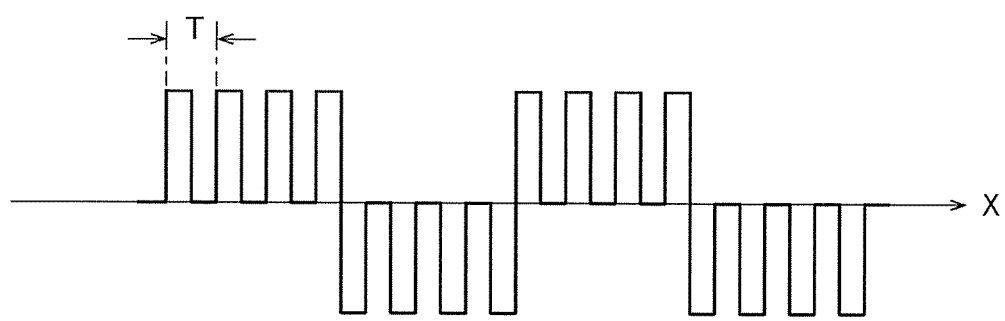
Figure 3:
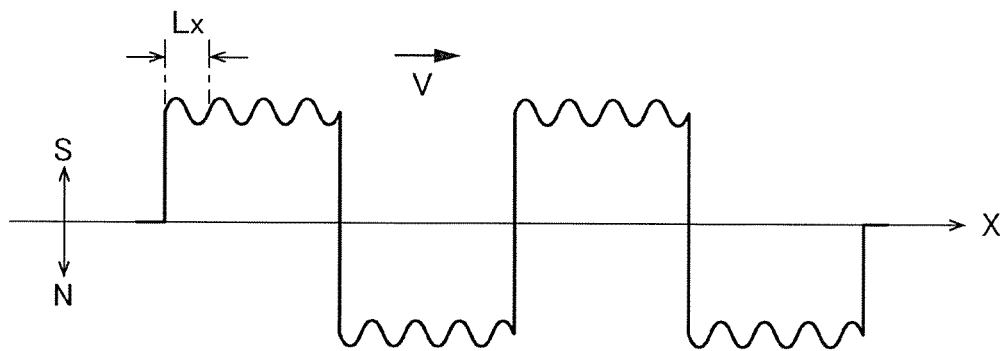
Figure 3:
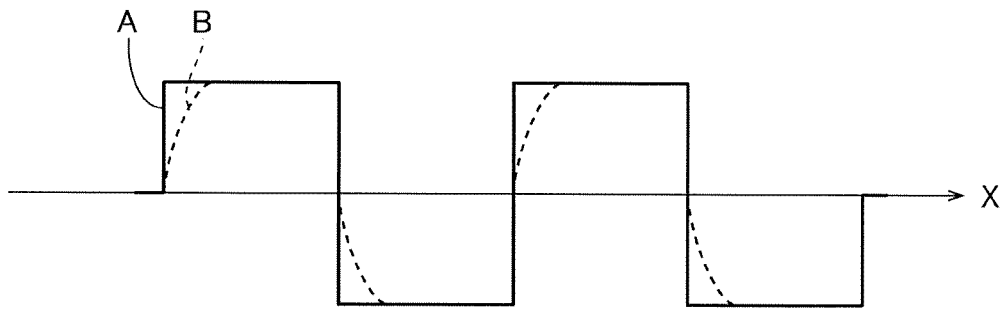

FIG. 3 includes views for illustrating a waveform of the chopping current, a magnetized pattern by the chopping current, and a reproduced waveform. FIG. 3(*a*) is a view for illustrating the magnetic data in which S-poles and N-poles are arranged. FIG. 3(*b*) illustrates the waveform of the chopping current for recording the magnetic data in FIG. 3(*a*), and FIG. 3(*c*) illustrates the magnetized pattern that is formed by the chopping current in FIG. 3(*b*). FIG. 3(*d*) is a view for schematically illustrating the reproduced waveform that is acquired when the reading magnetic head 6B readers the magnetized pattern. In the card reader 1, a recording direction of the magnetic data in the magnetic card 2 is a direction that matches the card transport direction X. FIG. 3 illustrates an example of a case where an effective voltage is reduced by chopping control in order to record the magnetic data in a low coercive force card (a Lo-Co card).

The writing drive circuit 20 turns on/off the write current in the cycle and at the duty ratio set by the CPU 10 to generates the chopping current, and supplies the chopping current to the reading coil 62B. In this way, the effective voltage through the reading coil 62B is reduced without reducing a power supply voltage of the write current. The CPU 10 generates the chopping current at the duty ratio that corresponds to magnetization strength of the magnetic card 2. In addition, the CPU 10 sets the on/off cycle of the chopping current such that the on/off cycle of the chopping current satisfies a condition, which will be described below.

As illustrated in FIG. 3(*b*), when the magnetic card 2 is magnetized to have the S-pole and the N-pole, a direction of the chopping current is reversed so that the writing magnetic head 6A reverses the polarity of the magnetic field to be generated. As illustrated in FIG. 3(*c*), the magnetized pattern that is formed by the chopping current is a pattern that includes fluctuations corresponding to on/off of the chopping current. When a card transport velocity is denoted by V, a length Lx of the magnetized pattern in a recording direction (that is, the card transport direction X) that is formed in a period in which the chopping current is turned on/off once (that is, a chopping cycle T) is Lx=VT.

In addition, since the chopping cycle T=1/f (f: a chopping frequency), Lx=V/f. In the card reader 1, the magnetized pattern that is recorded by the reading magnetic head 6B includes at least one peak, at which the magnetization strength is the highest, within a range having the length Lx in the recording direction.

The frequency f of the chopping current is set such that the length Lx of the magnetized pattern in the recording direction, which is formed in the single on/off period (the chopping cycle T), is shorter than the reading gap Gb that is formed in the core 63B of the reading magnetic head 6B. That is, the frequency f of the chopping current is set to satisfy a condition of VT<Gb (V/f<Gb). As a result, when the reading magnetic head 6B reads the magnetized pattern that is recorded at the chopping current, the magnetized pattern includes the at least one peak (at which the magnetization strength is the highest) within the range of the reading gap Gb. In order to achieve such a configuration, as the first control signal S1 used to set on/off timing of the chopping current, the CPU 10 supplies the writing drive circuit 20 with a signal used to set a cycle that satisfies the condition of VT (V/f)<Gb.

A reproduced waveform A in FIG. 3(*d*) is the reproduced waveform at the time when the reading magnetic head 6B reads the magnetized pattern (the magnetized pattern in FIG. 3(*c*)) that is recorded by reducing the effective voltage in the chopping control. When the magnetized pattern that is formed by the chopping control passes the reading gap Gb, as described above, the peak at which the magnetization strength is the highest is included within the range of the reading gap Gb at any timing. Thus, the fluctuation in the magnetized pattern illustrated in FIG. 3(c) is less likely to be reflected to the reproduced waveform A. As a result, the favorable reproduced waveform A that is similar to the rectangular wave illustrated in FIG. 3(d) can be acquired. Therefore, the recorded magnetic data can be regenerated with a high degree of accuracy.

Here, a reproduced waveform B that is indicated by broken lines in FIG. 3(d) is the reproduced waveform of a case where the chopping control is not executed and the magnetic data in FIG. 3(a) is recorded at the constant write current, the voltage of which is low.

In the case where an effective value of the write current is reduced by reducing the voltage of the write current, a waveform of a rising portion in the reproduced waveform B does not become sharp like the rectangular wave. That is, it is understood that, when the chopping control is not executed, the favorable reproduced waveform as that in the case where the effective voltage is reduced by the chopping control is not acquired.

Main Effects of This Embodiment

As it has been described so far, in the card reader 1 according to this embodiment, the writing drive circuit 20, which supplies the write current to the writing coil 62A for recording the magnetic data, supplies the chopping current, on/off of which is switched in the specified cycle, to the writing coil 62A. Then, the effective voltage is adjusted by controlling the duty ratio of the chopping current, so as to adjust the magnetization strength for the magnetic card 2. Accordingly, there is no need to adjust the write current by using a resistor and a plurality of power supplies. Therefore, it is possible to downsize and reduce cost of the writing drive circuit 20 and to avoid an increase in a generated heat amount from the resistor.

In this embodiment, the frequency f of the chopping current is set such that the length Lx of the magnetized pattern in the recording direction that is recorded in the single on/off period (the chopping cycle T) of the chopping current becomes shorter than the reading gap Gb of the reading magnetic head 6B that reads the magnetic data (the magnetized pattern) recorded by the chopping current. That is, the frequency f of the chopping current is set to satisfy the condition of VT<Gb (V/f<Gb). As a result, the fluctuation in the magnetized pattern, which is caused by the on/off of the chopping current, is less likely to appear to the reproduced waveform A acquired by the reading magnetic head 6B. In this way, the favorable reproduced waveform can be acquired. Therefore, the recorded magnetic data can be reproduced with the high degree of accuracy.

Furthermore, compared to the magnetized pattern that is recorded at the constant write current with the low voltage, the magnetized pattern that is recorded by reducing the effective voltage by the chopping current has the favorable rising portion of the reproduced waveform, and the reproduced waveform has the similar shape to the rectangular wave. Accordingly, when the magnetic data is recorded in the low coercive force card (the Lo-Co card) or a card (a Mid-Co card) with the magnetization strength between the low coercive force card (the Lo-Co card) and a high coercive force card (a Hi-Co card), the favorable reproduced waveform can be acquired. Therefore, it is possible to reproduce the recorded magnetic data with the high degree of accuracy.

In this embodiment, the CPU 10 supplies the writing drive circuit 20 with the first control signal S1 used to set the on/off cycle of the chopping current, and also supplies the writing drive circuit 20 with the second control signal S2 used to set the duty ratio of the chopping current via the different route from the first control signal S1. In this way, the on/off cycle of the chopping current and the duty ratio can be controlled individually from each other. Therefore, it is possible to supply the chopping current in the cycle in which the favorable reproduced waveform can be acquired and to record the magnetic data with the magnetization strength that complies with a standard of the magnetic card 2.

Modified Embodiments (1) In the above embodiment, it is configured that the writing magnetic head 6A and the reading magnetic head 6B are provided and that the writing coil 62A and the reading coil 62B are provided to the different heads from each other. However, the writing coil 62A and the reading coil 62B can be provided to the same head. For example, in the case where the writing coil 62A and the reading coil 62B are wound around a common core to write the magnetic data, the writing drive circuit 20 may supply the write current to the writing coil 62A. Then, when the magnetic data is read, an induced current that is generated to the reading coil 62B may be output to the reading circuit 30. Alternatively, a single coil can function as both of the writing coil 62A and the reading coil 62B.

(2) In the above embodiment, the writing drive circuit 20 is the chopping circuit, and the motor driver IC is used as the chopping circuit. However, another circuit can be used as the chopping circuit. For example, an H-Bridge circuit may be used to constitute the chopping circuit. In addition, the chopping control can be executed by directly controlling a transistor or an FET by the CPU 10.

The invention claimed is:

1. A card reader comprising:
   a writing coil that is provided to a magnetic head for recording magnetic data in a magnetic card; and
   a drive circuit that supplies a write current to the writing coil, wherein
   the drive circuit is a chopping circuit that supplies a chopping current, on/off of which is switched in a specified cycle, as the write current to the writing coil, and
   an on/off cycle of the chopping current is a cycle in which a length of a magnetized pattern in a recording direction is shorter than a reading gap formed in a core around which the writing coil is wound or a core around which a reading coil being separately provided from the writing coil is wound, the magnetized pattern in the recording direction being formed in the magnetic card by the chopping current in a period including one each of the on and the off.

2. The card reader according to claim 1, wherein the drive circuit is a motor driver IC.

3. The card reader according to claim 1 further comprising:
   a control unit that supplies the drive circuit with a first control signal used to set the on/off cycle of the chopping current and a second control signal used to set a duty ratio of the chopping current.

4. The card reader according to claim 3, wherein the drive circuit is a motor driver IC.

5. The card reader according to claim 3, wherein the second control signal is a signal used to set the duty ratio that corresponds to magnetization strength of the magnetic data in the magnetic card.

6. The card reader according to claim 5, wherein the drive circuit is a motor driver IC.

7. A control method for a card reader that includes a magnetic head for recording magnetic data in a magnetic card, the control method for the card reader comprising:
supplying a chopping current, on/off of which is switched in a specified cycle, to a writing coil provided to the magnetic head from a drive circuit for supplying a write current to the writing coil so as to record the magnetic data in the magnetic card, wherein
an on/off cycle of the chopping current is a cycle in which a length of a magnetized pattern in a recording direction is shorter than a reading gap formed in a core around which the writing coil is wound or a core around which a reading coil being separately provided from the writing coil is wound, the magnetized pattern in the recording direction being formed in the magnetic card by the chopping current in a period including one each of the on and the off.

8. The control method for the card reader according to claim 7 further comprising:
supplying the drive circuit with a first control signal used to set the on/off cycle of the chopping current and a second control signal used to set a duty ratio of the chopping current from a control unit that controls the drive circuit.

9. The control method for the card reader according to claim 8, wherein
the second control signal is a signal used to set the duty ratio that corresponds to magnetization strength of the magnetic data in the magnetic card.

* * * * *